United States Patent
Gardner et al.

(10) Patent No.: US 11,318,752 B2
(45) Date of Patent: May 3, 2022

(54) LOGIC CIRCUITRY PACKAGE

(71) Applicant: HEWLETT-PACKARD DEVELOPMENT COMPANY, L.P., Spring, TX (US)

(72) Inventors: James Michael Gardner, Corvallis, OR (US); Scott A. Linn, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 16/769,922

(22) PCT Filed: Oct. 25, 2019

(86) PCT No.: PCT/US2019/058004
§ 371 (c)(1),
(2) Date: Jun. 4, 2020

(87) PCT Pub. No.: WO2021/080596
PCT Pub. Date: Apr. 29, 2021

(65) Prior Publication Data
US 2022/0001672 A1 Jan. 6, 2022

(51) Int. Cl.
*B41J 2/175* (2006.01)
*B41J 2/045* (2006.01)
*G05B 19/042* (2006.01)
*G05B 19/00* (2006.01)

(52) U.S. Cl.
CPC ....... *B41J 2/17566* (2013.01); *B41J 2/04543* (2013.01); *B41J 2/17526* (2013.01); *B41J 2/17546* (2013.01); *G05B 19/00* (2013.01); *G05B 19/042* (2013.01)

(58) Field of Classification Search
CPC ............... B41J 2/04543; B41J 2/17526; B41J 2/17546; B41J 2/17566; G05B 19/00
See application file for complete search history.

(56) References Cited

U.S. PATENT DOCUMENTS 6,293,143 B1 9/2001 Denton et al.
6,443,547 B1 9/2002 Takahashi et al.
(Continued)

FOREIGN PATENT DOCUMENTS

EP 3311126 2/2020
JP 2013095113 5/2013
(Continued)

*Primary Examiner* — Anh T Vo
(74) *Attorney, Agent, or Firm* — Dicke Billig & Czaja PLLC

(57) ABSTRACT

A logic circuitry package for a replaceable print apparatus component includes an analog sensor cell block with a plurality of sensor cells, analog control circuitry to bias and control the analog sensor cell block, an interface to communicate with a print apparatus logic circuit, a dedicated bit field that indicates whether the logic circuitry package is in a power saving mode, and at least one logic circuit. The at least one logic circuit may be configured to receive, via the interface, a request to cause the analog sensor cell block to provide sensor information for at least one sensor measurement; and selectively enable and disable power to the analog control circuitry based on the request and a value of the dedicated bit field.

16 Claims, 10 Drawing Sheets

(56) References Cited

U.S. PATENT DOCUMENTS

| | | | |
|---|---|---|---|
| 6,469,692 B2 * | 10/2002 | Rosenberg | A63F 13/06 345/161 |
| 6,705,694 B1 | 3/2004 | Barbour et al. | |
| 7,816,808 B2 | 10/2010 | Menas et al. | |
| 7,891,253 B2 * | 2/2011 | Shipton | G01L 1/146 73/780 |
| 9,487,017 B2 | 11/2016 | Ge et al. | |
| 2004/0021711 A1 | 2/2004 | Hasseler | |
| 2006/0125859 A1 * | 6/2006 | Walmsley | B41J 2/04543 347/12 |
| 2017/0144451 A1 | 5/2017 | Ge et al. | |
| 2019/0278516 A1 | 9/2019 | Rowley | |

FOREIGN PATENT DOCUMENTS

| | | |
|---|---|---|
| WO | WO-2008117194 | 10/2008 |
| WO | WO-2018186847 | 10/2018 |

* cited by examiner

LOGIC CIRCUITRY PACKAGE

CROSS-REFERENCE TO RELATED APPLICATIONS

This application is a U.S. National Stage Application of PCT Application No. PCT/US2019/058004, filed Oct. 25, 2019, entitled "LOGIC CIRCUITRY PACKAGE.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
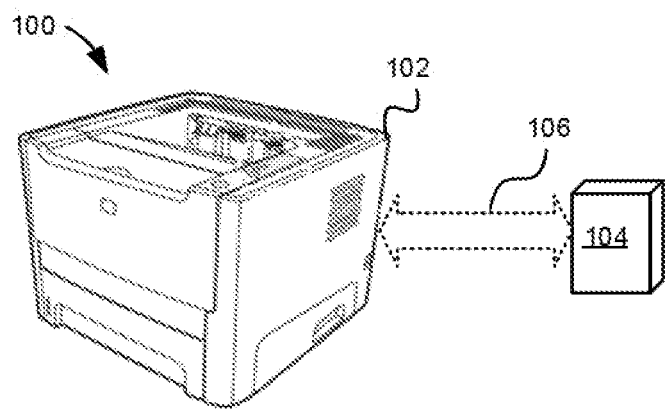
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

One example of logic circuitry associated with a replaceable print apparatus component may include an analog sensor cell block with a plurality of sensor cells, analog control circuitry to bias and control the analog sensor cell block, an interface to communicate with a print apparatus logic circuit, a dedicated bit field that indicates whether the logic circuitry package is in a power saving mode, and at least one logic circuit. The at least one logic circuit may receive, via the interface, a request to cause the analog sensor cell block to provide sensor information for at least one sensor measurement, and selectively enable and disable power to the analog control circuitry based on the first request and value of the dedicated bit field. In some examples, the at least one logic circuit may intelligently enable and disable the analog circuitry based on state machine control that manages sensor measurements. In one example, DC power to the analog circuitry is briefly enabled to perform a sensor measurement, and then disabled again internally automatically in a micro-second timescale. Overall power dissipation may be reduced by 90% with this method, resulting in less heat generation and more stable sensor measurements.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the encryption key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
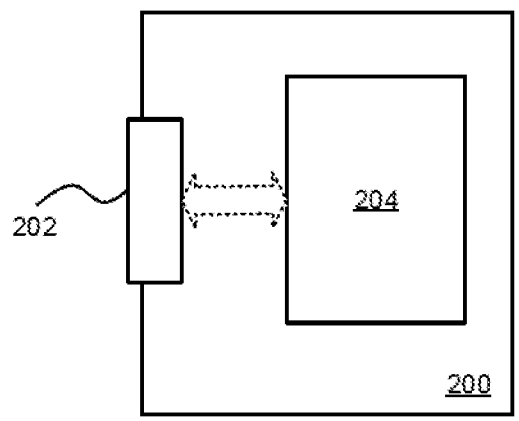
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
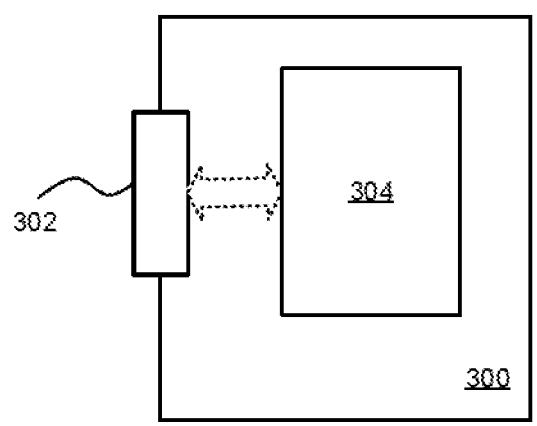
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output.

Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
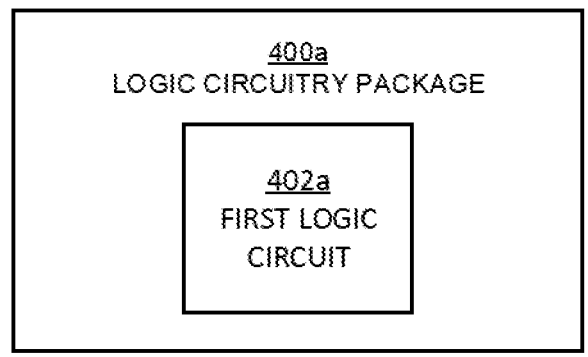
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store clock enable, clock source replacement, clock divider, and/or dither parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
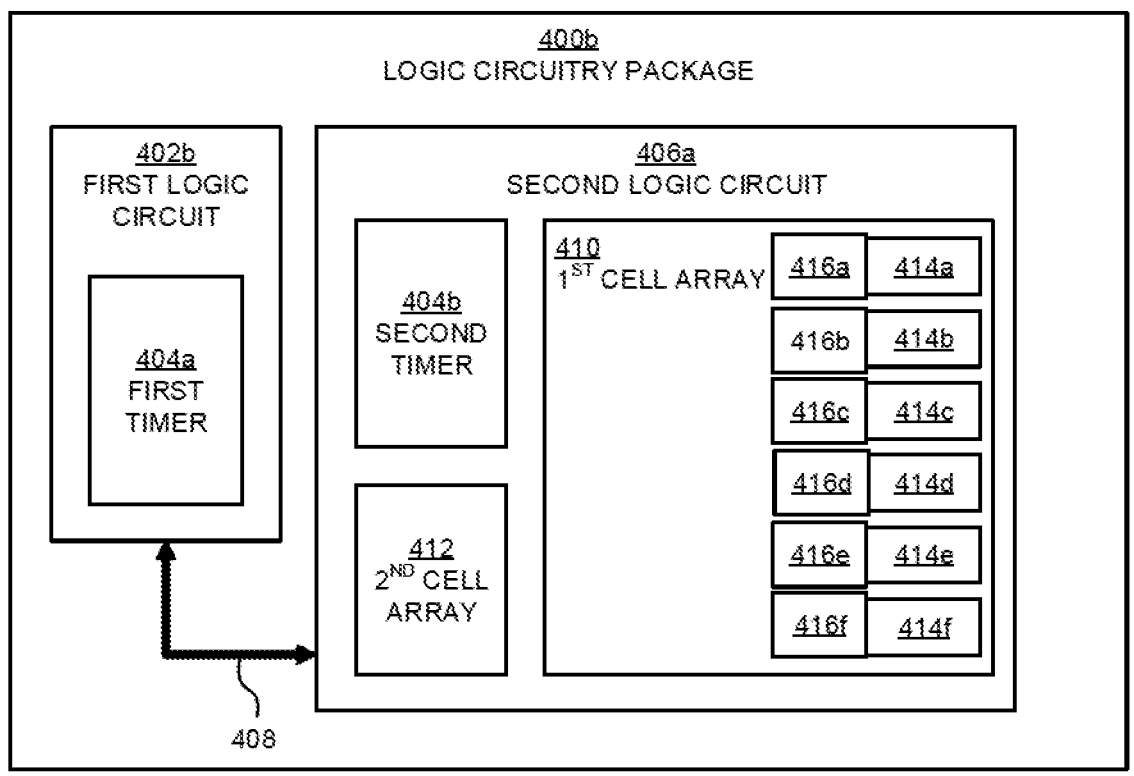

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408.

In one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include an RC circuit, a ring oscillator, or some other form of oscillator or timer. In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to change the initial address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may be identifiable by sub-IDs. The sensor IDs and sub-IDs may include a combination of addresses and values, for example register addresses and values. The addresses of the sensor ID and sub-ID are different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs and sub-IDs.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors, etc.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO02018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406*a*.

Figure 4C:
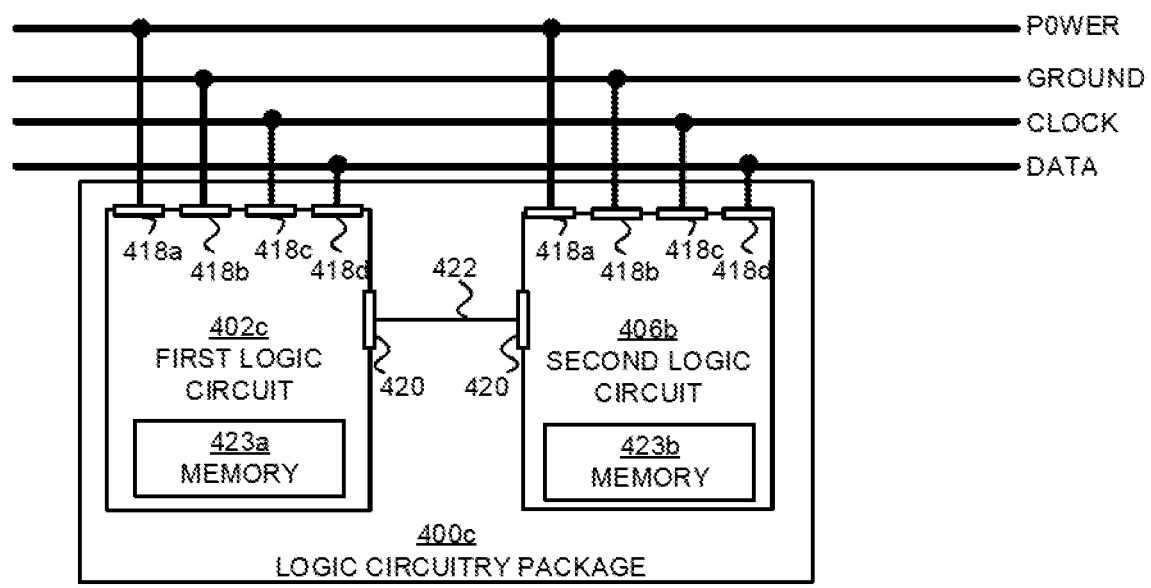

FIG. 4C illustrates an example of how a first logic circuit 402*c* and a second logic circuit 406*b* of a logic circuitry package 400*c*, which may have any of the attributes of the circuits/packages described above, may connect to an I2C bus and to each other. As is shown in the Figure, each of the circuits 402*c*, 406*b* has four pads (or pins) 418*a*-418*d* connecting to the Power, Ground, Clock, and Data lines of an I2C bus. In another example, four common connection pads are used to connect both logic circuits 402*c*, 406*b* to four corresponding connection pads of the print apparatus controller interface. It is noted that in some examples, instead of four connection pads, there may be less connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402*c*, 406*b* has a contact pin 420, which are connected by a common signal line 422. The contact pin 420 of the second circuit serves as an enablement contact thereof.

In this example, each of the first logic circuit 402*c* and the second logic circuit 406*b* include a memory 423*a*, 423*b*. The memory 423*a* of the first logic circuit 402*c* stores information including cryptographic values (for example, a cryptographic key and/or a seed value from which a key may be derived) and identification data and/or status data of the associated replaceable print apparatus component. In some examples, the memory 423*a* may store data representing characteristics of the print material, for example, any part, or any combination of its type, color, color map, recipe, batch number, age, etc.

The memory 423*b* of the second logic circuit 406*b* includes a programmable address register to contain an initial address of the second logic circuit 406*b* when the second logic circuit 406*b* is first enabled and to subsequently contain a further (temporary) second address (in some examples in a volatile manner). The further, e.g., temporary, second address may be programmed into the second address register after the second logic circuit 406*b* is enabled, and may be effectively erased or replaced at the end of an enablement period. In some examples, the memory 423*b* may further include programmable registers to store any, or any combination of a read/write history data, cell (e.g., resistor or sensor) count data, Analog to Digital converter data (ADC and/or DAC), and a clock count, in a volatile or non-volatile manner. The memory 423*b* may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423*b* of the second logic circuit 406*b* stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406*b*, in some operational states, the memory 423*b* of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406*b*).

While the memories 423*a*, 423*b* are shown as separate memories here, they could be combined as a shared memory resource, or divided in some other way. The memories 423*a*, 423*b* may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400*c* is shown in FIG. 4C, there may be a plurality of packages with a similar or a different configuration attached to the bus.

Figure 4D:
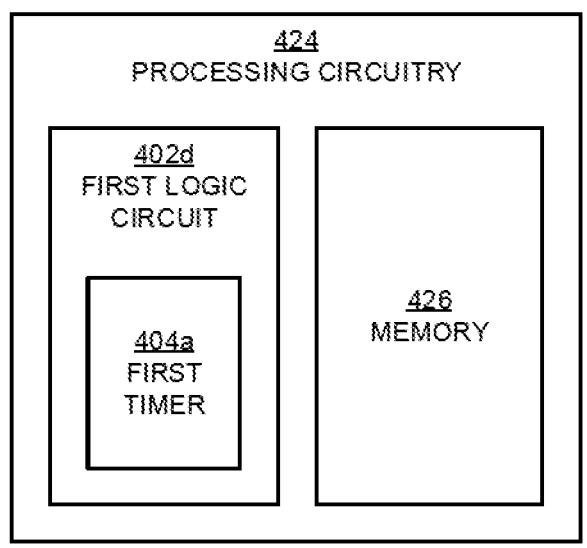

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402*d* which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402*d*. The first logic circuit 402*d* may have any of the attributes of the other examples circuits/packages described in this disclosure.

The first logic circuit 402*d* is adapted to participate in authentication of the print materials container by a print apparatus in which the container is installed. For example, this may include a cryptographic process such as any kind of cryptographically authenticated communication or message exchange, for example based on an encryption key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402*d* may participate in a message to derive a session key with the print apparatus and messages may be signed using a message authentication code based on such a session key. Examples of logic circuits configured to cryptographically authenticate messages in accordance with this paragraph are described in U.S. Pat. No. 9,619,663.

In some examples, the memory 426 may store data including: identification data and read/write history data. In some examples, the memory 426 further includes cell count data (e.g., sensor count data) and clock count data. Clock count data may indicate a clock speed of a first and/or second timer 404*a*, 404*b* (i.e., a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored in the memory 426 is to be communicated in response to commands received via the second address. In some examples, the memory 426 includes a programmable address register or memory field to store a second address of the processing circuitry (in some examples in a volatile manner). The first logic circuit 402d may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404a, 404b as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor.

Figure 4E:
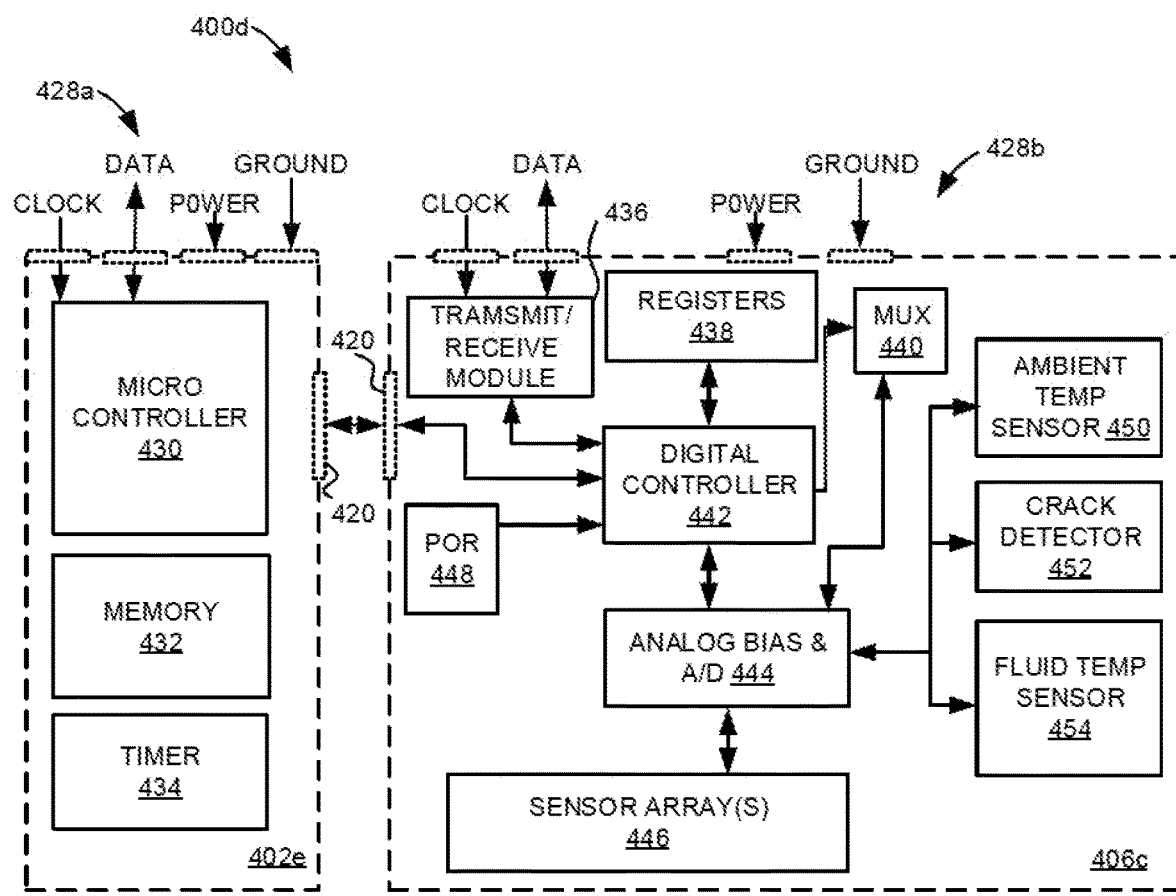

FIG. 4E illustrates another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors. For example, a current may be provided to a sensing resistor and the resultant voltage may be converted to a digital value. That digital value may be stored in a register and read out (i.e., transmitted as serial data bits, or as a 'bitstream') over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
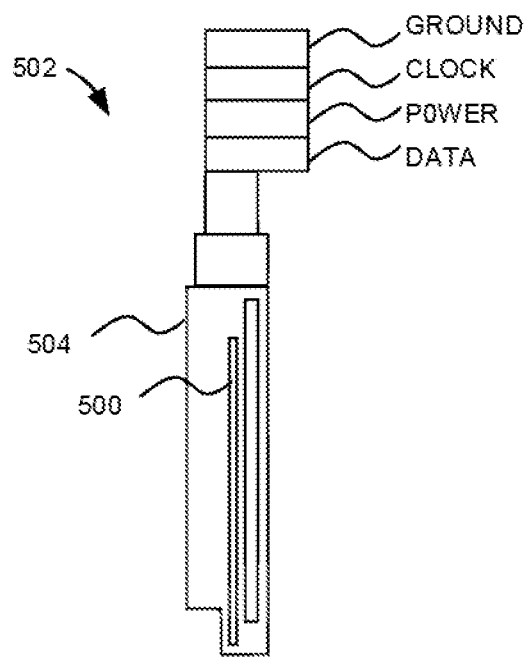
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
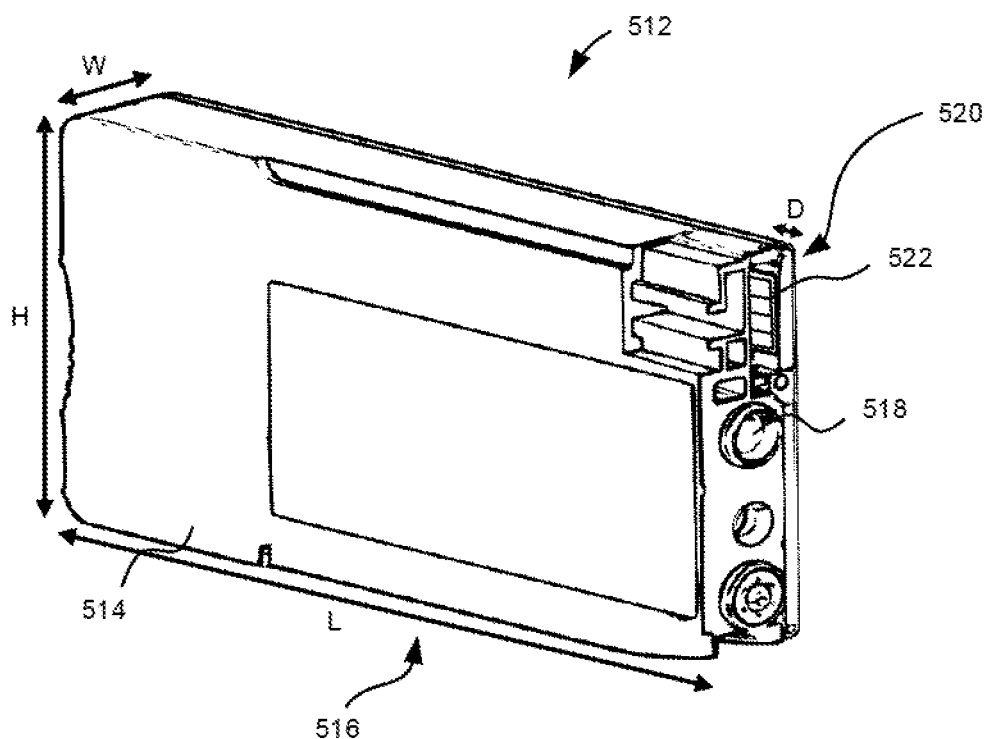
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

Placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

Figure 6:
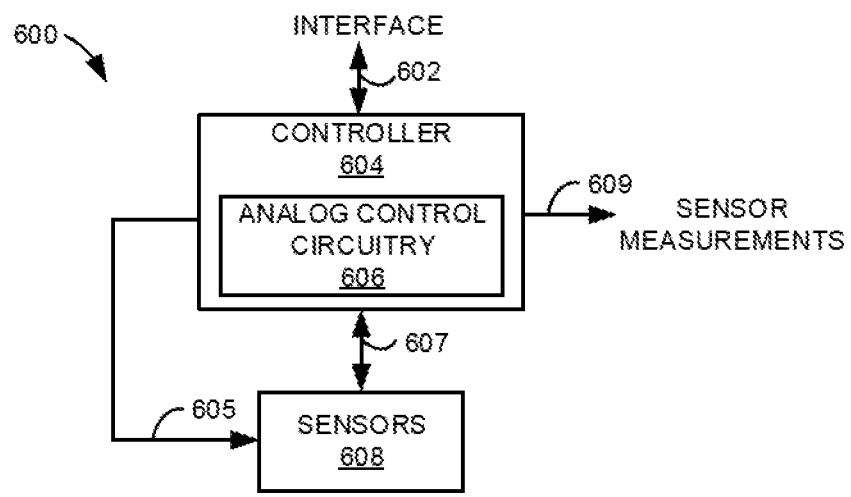
FIG. 6 illustrates another example of processing circuitry.

FIG. 6 illustrates another example of processing circuitry 600. Processing circuity 600 includes an interface (e.g., I2C interface) 602, a controller 604 including analog control circuitry 606, and a plurality of analog sensors 608. Interface 602 is electrically coupled to controller 604. A first output of controller 604 outputs sensor enable signals 605 to sensors 608. Analog control circuitry 606 includes bias circuitry to provide current to sensors 608, and receives sensor information from sensors 608, as represented by communication link 607. Based on the received sensor information, analog control circuitry 606 performs an analog-to-digital conversion and outputs digital sensor measurement information 609.

In one example, controller 604 may receive a first request through the interface 602 to enter a power saving mode. The first request may set at least one bit in a dedicated bit field that indicates whether the circuitry is in a power saving mode. Controller 604 may subsequently receive a second request through the interface 602 to cause the sensors 608 to provide sensor information for at least one sensor measurement. In response to the first and second requests, controller 604 selectively enables and disables power to the analog control circuitry 606, and causes sensors 608 to provide the sensor information for the at least one sensor measurement via sensor enable signals 605. In one example, the controller 604 may intelligently enable and disable power to the analog control circuitry 606 based on state machine control that manages sensor measurements. In one example, DC power to the analog control circuitry 606 is briefly enabled to allow the analog control circuitry 606 to perform a sensor measurement based on received sensor information, and then the DC power is disabled again automatically after the sensor measurement.

Figure 7:
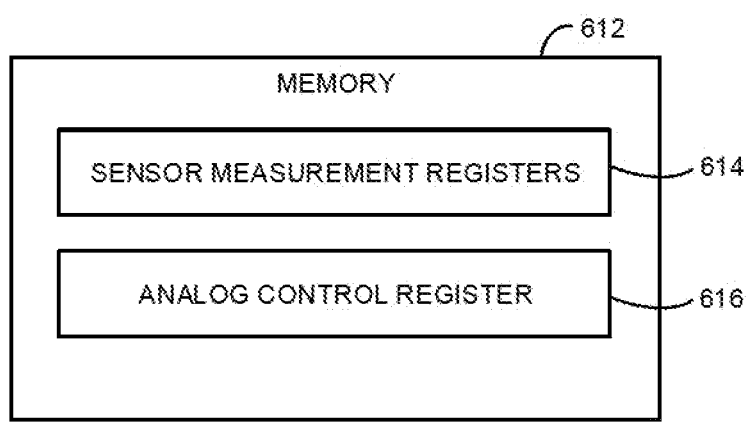
FIG. 7 illustrates one example of a memory of a logic circuitry package.

FIG. 7 illustrates one example of a memory 612 of a logic circuitry package, such as logic circuitry package 400a-400d, or processing circuitry 424 or 600. Memory 612 may include volatile or non-volatile memory. In one example, memory 612 includes registers 614 and 616. A first register 614 may store sensor measurement information, and a second register 616 may store analog control information.

In one example, register 614 is written to in order to request the performance of sensor measurements. In one example, register 616 contains multiple bits that control how power to analog circuitry (e.g., analog control circuitry 606, which provides power to analog sensors 608) is enabled and disabled. An analog enable bit in the register 616 controls an analog enable signal that enables/disables power to the analog circuitry. When the analog enable bit is set, the analog circuitry may be continuously enabled. A power saving mode enable bit in the register 616 is a dedicated bit field that controls a power saving mode enable signal that controls whether power to the analog circuitry will be intelligently enabled/disabled based on an internal state machine status (e.g., whether a sensor measurement is occurring or not). In one example, the power saving mode enable bit is used in conjunction with the analog enable bit.

The information in registers 614 and 616 may be written to memory 612 by a print apparatus logic circuit via an interface (e.g., an I2C interface). The information in registers 614 and 616 may be read by a print apparatus logic circuit via the interface. In one example, each register 614 and 616 is an 8-bit register.

Figure 8:
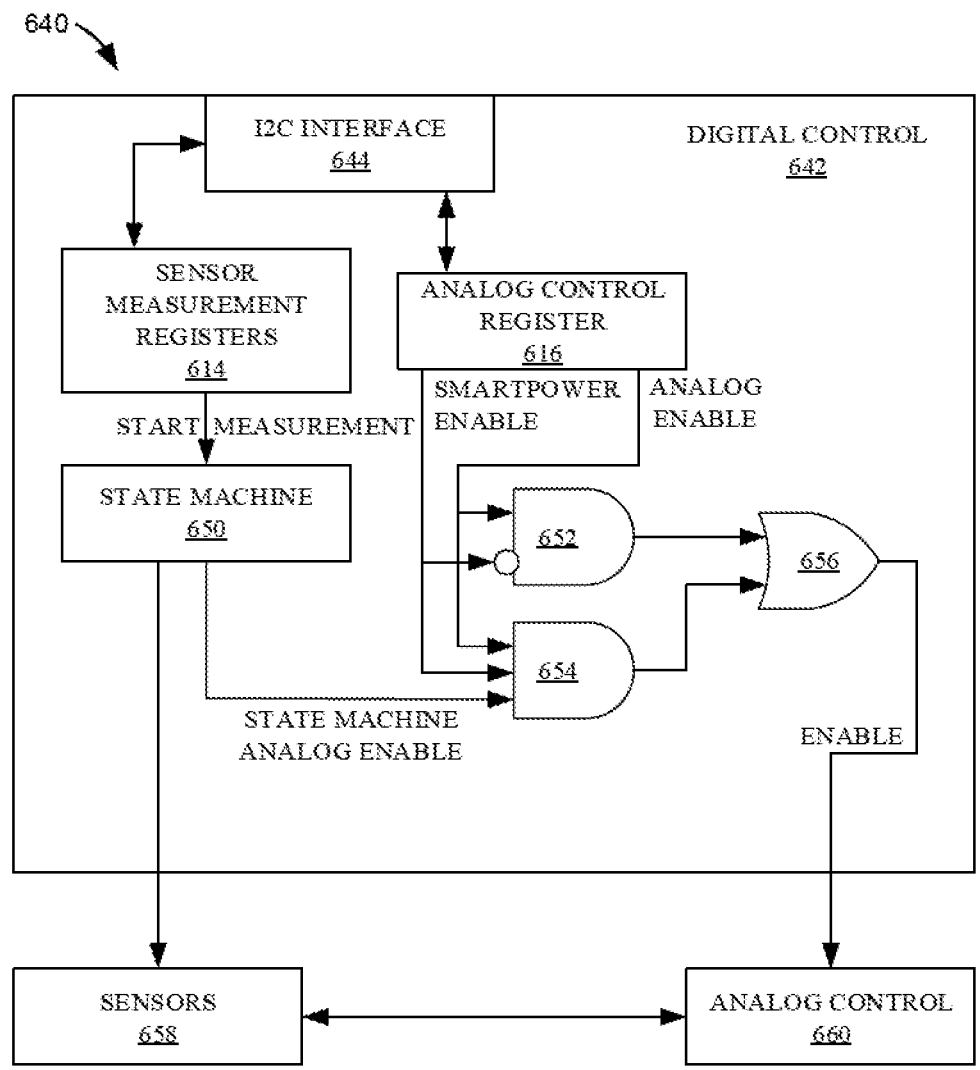
FIG. 8 illustrates another example of processing circuitry.

FIG. 8 illustrates another example of processing circuitry 640. Processing circuitry 640 includes digital control circuitry 642, analog sensor cell block with a plurality of sensor cells 658 (also referred to as "sensors 658"), and analog control circuitry 660. In one example, analog control circuitry 660 includes bias circuitry for providing bias currents to sensors 658, amplifier circuitry to amplify sensor signals received from sensors 658, and A/D converter circuitry to convert sensor signals received from sensors 658. Digital control circuitry 642 includes I2C interface 644, sensor measurement registers 614, analog control register 616, state machine 650, AND gates 652 and 654, and OR gate 656.

In one example, processing circuitry 640 is initially set up for sensor measurements (e.g., an internal oscillator enabled with appropriate dividers, sensor type selected, gain/vdac set, etc.). As part of the initial setup, I2C interface 644 may receive a command to write to the analog control register 616 to set the analog enable bit in the register 616 to enable power to the analog circuitry, and at the same time, to set the power saving mode enable bit in the register 616 to enable the power saving mode for intelligent control of power to the analog circuitry. In another example, both of these functions may be contained in a single bit. Setting the analog enable bit in the register 616 results in a logic high analog enable signal being output from register 616 to a first input of AND gate 652, and to a first input of AND gate 654. Setting the power saving mode enable bit in the register 616 results in a logic high smart power saving mode ("smartpower mode") enable signal being output from register 616 to a second, inverted input of AND gate 652, and to a second input of AND gate 654. The logic high smart power saving mode enable signal is inverted to a logic low signal at the second input of the AND gate 652, resulting in the AND gate 652 outputting a logic low signal to a first input of the OR gate 656.

As mentioned above, when the power saving mode enable bit and the analog enable bit in the register 616 are set, the first two inputs of the AND gate 654 will be at a logic high. Thus, the AND gate 654 will output a logic high signal when the third input of the AND gate 654 is at a logic high. The third input of the AND gate 654 is controlled by the state machine 650, which also controls sensor measurements by sensors 658. After the processing circuitry 640 is initially set up for sensor measurements, I2C interface 644 may receive a command to write to the sensor measurement registers 614 to request the performance of sensor measurements. In one example, one of three different sensor measurement modes may be selected in the command to registers 614.

In response to receiving the write command to request the performance of a sensor measurement, the registers 614 will output a start measurement signal to state machine 650 to indicate that a sensor measurement has been requested. In response to the start measurement signal, and prior to beginning the sensor measurement (i.e., the A/D conversion of the sensor information), state machine 650 sends a logic high state machine analog enable signal to the third input of the AND gate 654, which causes the output of the AND gate 654 to output a logic high signal to the second input of the OR gate 656. The logic high signal at the second input of the OR gate 656 causes the OR gate 656 to output a logic high enable signal to the analog control circuitry 660, which causes the analog control circuitry 660 to consume power and send a bias current to the sensors 658.

After powering up the analog control circuitry 660 and the sensors 658, the state machine 650 causes the sensors 658 to provide sensor information for at least one sensor measurement. Upon completion of the at least one sensor measurement by the analog control circuitry 660, the state machine 650 sends a logic low state machine analog enable signal to the third input of the AND gate 654, which causes the output of the AND gate 654 to output a logic low signal to the second input of the OR gate 656. Since the first input of the OR gate 656 is also at a logic low, as discussed above, the logic low signal at the second input of the OR gate 656 causes the OR gate 656 to output a logic low enable signal to the analog control circuitry 660, which causes the analog control circuitry 660 to disable power to itself and the sensors 658.

When the power saving mode enable bit is set in register 616, the analog control circuitry 660 will be disabled whenever sensor measurements are not being performed. In one example, the analog control circuitry 660 and the sensors 658 are enabled at the start of the sensor measurement process, and are enabled with enough time for the signal to stabilize before being used by the analog-to-digital converter to convert the analog sensor information to digital values. In one example, the analog control circuitry 660 is disabled when the analog-to-digital conversion has completed. The circuitry 640 handles all of the timing to enable/disable the analog circuitry.

Note that, if the power saving mode is not enabled in analog control register 616, the signal at the second input of the AND gate 652 will be a logic low that is inverted at the input into a logic high signal, and the AND gate 652 will output a logic high signal to the first input of the OR gate 656 whenever the analog enable bit has been set in register 616. In this situation, OR gate 656 outputs a logic high enable signal to enable the analog circuitry as long as the analog enable bit is set in register 616.

For a logic circuitry package that includes an ink level sensor that relies on point heating and measurement of temperature sensors to help determine the ink level in a supply, the processing circuitry disclosed herein helps eliminate any extraneous power consumed by the ink level sensor, thereby reducing generated heat that could cause a temperature rise that is not uniform to all sensor measurements, and that could cause an artificial shift in sensor measurements that are not a result of ink level. In order to minimize the offset from room temperature and obtain more resolution between heated and non-heated measurements, the processing circuitry disclosed herein may cause an automatic reduction in DC power usage by analog circuits that operate voltage references, bias current generation, analog comparators and amplifiers, etc. The DC power may be reduced by disabling the DC current consumed by the analog circuits.

In some examples, a user does not have to be constantly enabling/disabling power to analog circuitry, as it may be self-enabling/disabling once the power saving mode bit is set in control register 616. Thus, external communications with the circuitry do not have to be performed to turn the analog circuitry on and off. The power saving mode minimizes heat generation, which allows for more accurate ambient temperature measurements (e.g., ink supply temperature measurement).

Figure 9A:
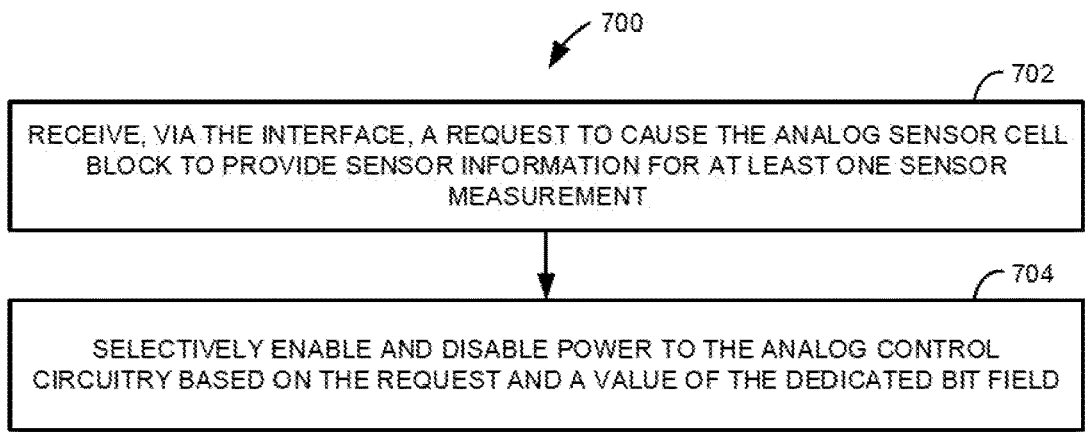
FIGS. 9A-9D are flow diagrams illustrating one example of a method that may be carried out by a logic circuitry package.

FIGS. 9A-9D are flow diagrams illustrating one example of a method 700 that may be carried out by a logic circuitry package, such as logic circuitry package 400a-400d, or by processing circuitry 424, 600, or 640. The logic circuitry package may include an analog sensor cell block with a plurality of sensor cells, analog control circuitry to bias and control the analog sensor cell block, an interface to communicate with a print apparatus logic circuit, a dedicated bit field that indicates whether the logic circuitry package is in a power saving mode, and at least one logic circuit. As illustrated in FIG. 9A at 702, the at least one logic circuit may receive, via the interface, a request to cause the analog sensor cell block to provide sensor information for at least one sensor measurement. At 704, the at least one logic circuit may selectively enable and disable power to the analog control circuitry based on the request and a value of the dedicated bit field. In some examples of method 700, the selectively enabling and disabling power to the analog control circuitry correspondingly selectively enables and disables power to the analog sensor cell block.

Figure 9B:
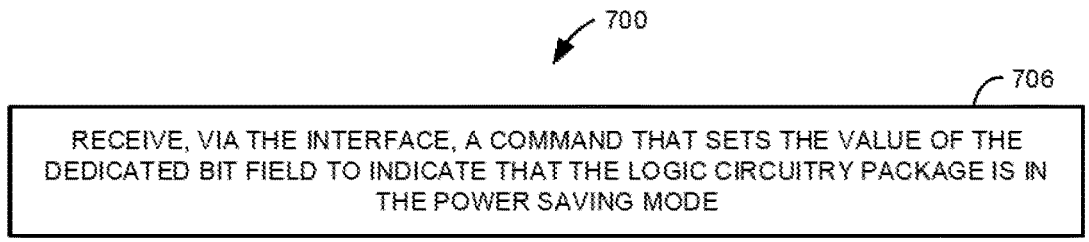

As illustrated in FIG. 9B, at 706 in method 700, the at least one logic circuit may further receive, via the interface, a command that sets the value of the dedicated bit field to indicate that the logic circuitry package is in the power saving mode.

Figure 9C:
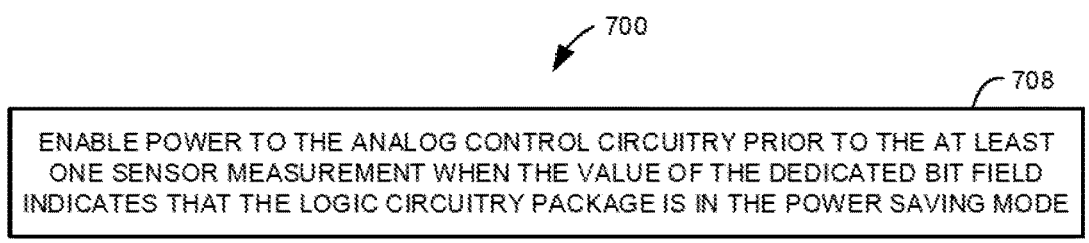

As illustrated in FIG. 9C, at 708 in method 700, the at least one logic circuit may further enable power to the analog control circuitry prior to the at least one sensor measurement when the value of the dedicated bit field indicates that the logic circuitry package is in the power saving mode.

Figure 9D:
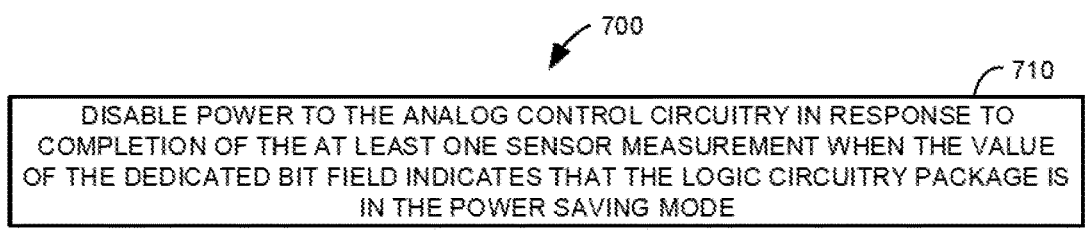

As illustrated in FIG. 9D, at 710 in method 700, the at least one logic circuit may further disable power to the analog control circuitry in response to completion of the at least one sensor measurement when the value of the dedicated bit field indicates that the logic circuitry package is in the power saving mode.

In some examples, the at least one logic circuit in method 700 may include a state machine to generate a control signal to selectively enable and disable power to the analog control circuitry. The state machine may generate the control signal based on occurrences of sensor measurements. The interface in method 700 may include an I2C interface.

Figure 10A:
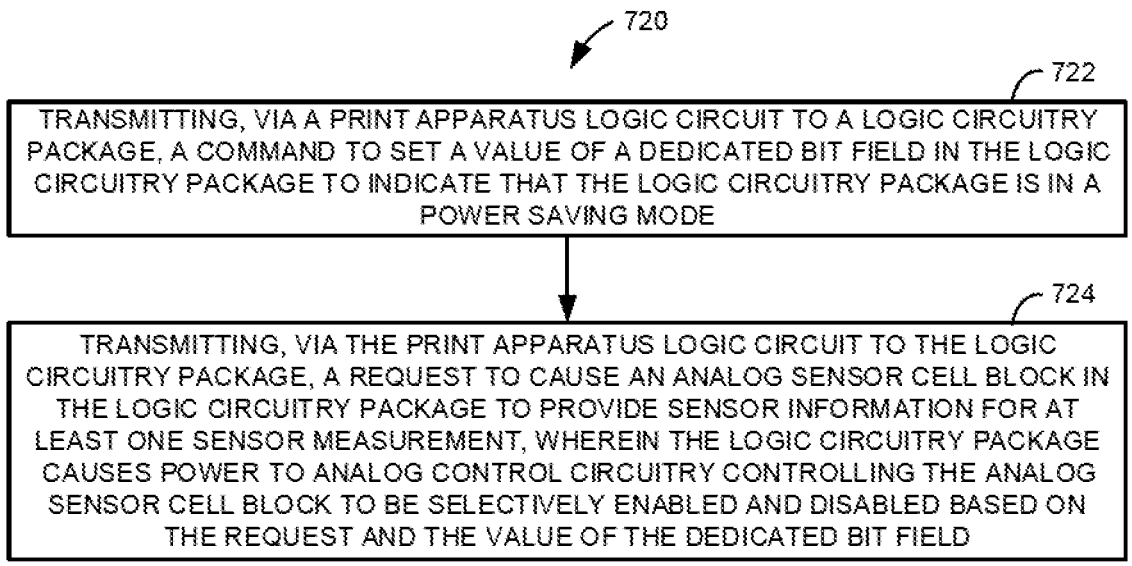
FIGS. 10A-10B are flow diagrams illustrating another example of a method that may be carried out by a logic circuitry package.
Figure 10B:
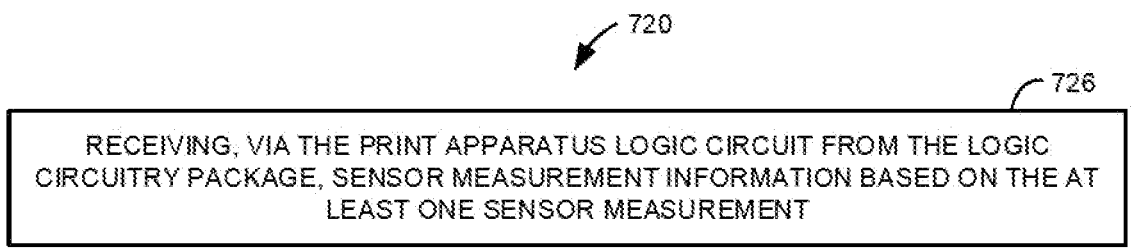

FIGS. 10A-10B are flow diagrams illustrating another example of a method 720 that may be carried out by a logic circuitry package, such as logic circuitry package 400a-400d, or by processing circuitry 424, 600, or 640. As illustrated in FIG. 10A, at 722, method 720 includes transmitting, via a print apparatus logic circuit to a logic circuitry package, a command to set a value of a dedicated bit field in the logic circuitry package to indicate that the logic circuitry package is in a power saving mode. At 724, the method 720 includes transmitting, via the print apparatus logic circuit to the logic circuitry package, a request to cause an analog sensor cell block in the logic circuitry package to provide sensor information for at least one sensor measurement, wherein the logic circuitry package causes power to analog circuitry controlling the analog sensor cell block to be selectively enabled and disabled based on the request and the value of the dedicated bit field.

As illustrated in FIG. 10B, at 726, method 720 may further include receiving, via the print apparatus logic circuit from the logic circuitry package, sensor measurement information based on the at least one sensor measurement.

Some examples are directed to a logic circuitry package, which includes an I2C interface to receive a sensor measurement request, an analog sensor cell block with a plurality of sensor cells, and analog control circuitry to bias and control the analog sensor cell block. The logic circuitry package also includes a dedicated bit field that indicates whether the logic circuitry package is in a power saving mode, and a controller to selectively enable and disable power to the analog control circuitry based on the received sensor measurement request and a value of the dedicated bit field.

The logic circuitry package may include a first register, and the sensor measurement request may include a command to write a value to the first register that indicates a type of sensor measurement to be performed. The logic circuitry package may include a second register to store the dedicated bit field, and the I2C interface may be configured to receive a command to set the value of the dedicated bit field in the second register to indicate that the logic circuitry package is in the power saving mode. The controller may enable power to the analog control circuitry to perform at least one sensor measurement when the value of the dedicated bit field indicates that the logic circuitry package is in the power saving mode. The controller may disable power to the analog control circuitry in response to completion of at least one sensor measurement when the value of the dedicated bit field indicates that the logic circuitry package is in the power saving mode. The controller may include a state machine to control sensor measurements and to generate a control signal to selectively enable and disable power to the analog control circuitry based on when the sensor measurements occur.

Some examples are directed to a replaceable print apparatus component, which includes any of the logic circuitry packages described herein. The replaceable print apparatus component may also include a housing having a height, a width less than the height, and a length greater than the height, the height parallel to a vertical reference axis, and the width extending between two sides; a print liquid reservoir within the housing; a print liquid output; an air input above the print liquid output; and an interface comprising interface pads for communicating with a print apparatus logic circuit, the interface pads provided at an inner side of one of the sides facing a cut-out for a data interconnect to be inserted, the interface pads extending along a height direction near a top and front of the component above the air input, wherein the air input is provided at the front on the same vertical reference axis parallel to the height direction, and wherein the vertical reference axis is parallel to and distanced from an axis that intersects the interface pads.

Figure 11:
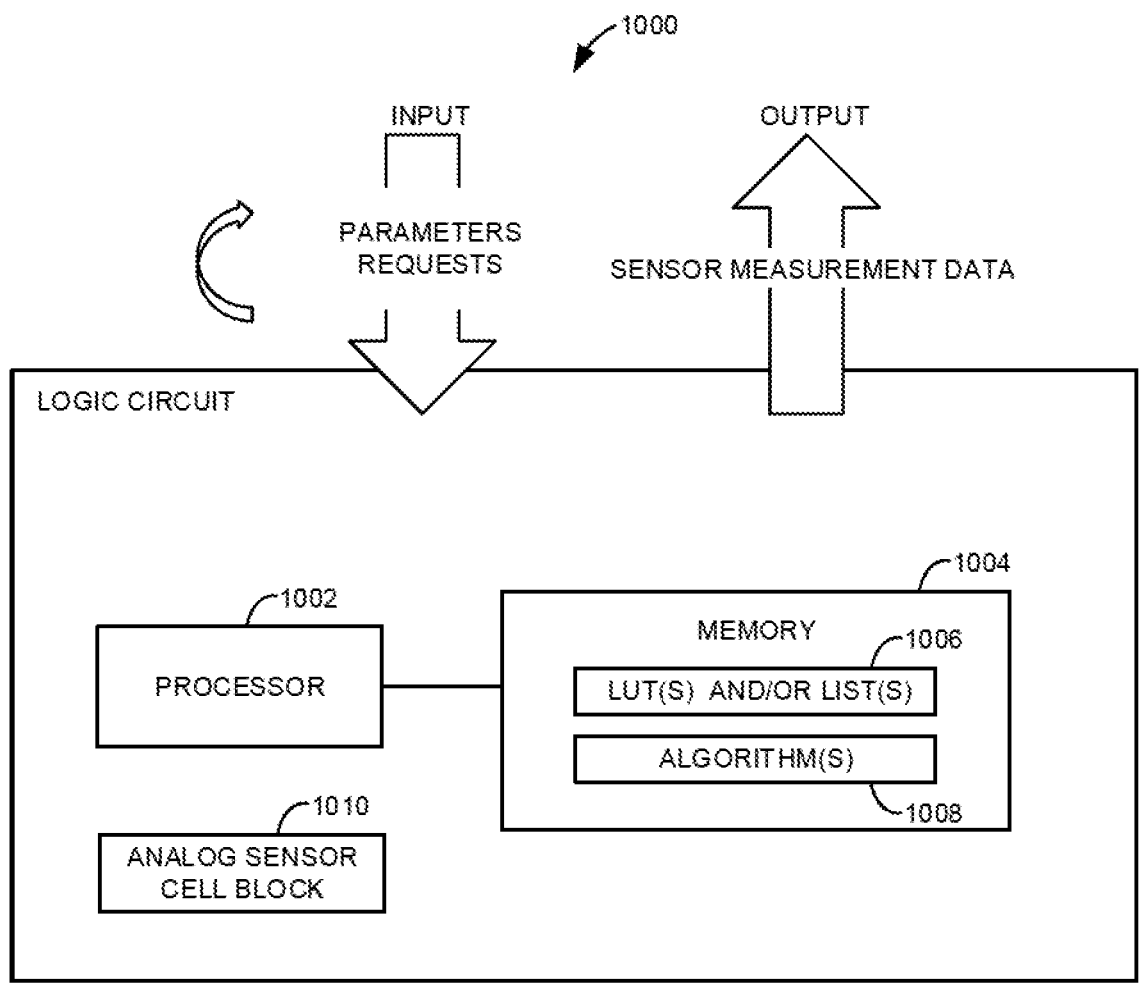
FIG. 11 illustrates another example of a logic circuitry package.

FIG. 11 illustrates another example of a logic circuitry package 1000. FIG. 11 illustrates how the logic circuitry package 1000 may generate a digital output (e.g., sensor measurement data) based on inputs including parameters and/or requests (e.g., to request sensor measurements; to set a value of a dedicated bit field that indicates whether the logic circuitry package 1000 is in a power saving mode; sensor IDs; etc.) sent digitally by the print apparatus. Logic circuitry package 1000 includes a logic circuit with a processor 1002 communicatively coupled to a memory 1004. Memory 1004 may store look up table(s) and/or list(s) 1006 and/or algorithm(s) 1008. Logic circuitry package 1000 may also include any of the features of logic circuitry packages 400a-400d or processing circuitry 424, 600, and/or 640 as previously described.

For example, the logic circuitry package 1000 may include analog sensor cell block 1010, which may include multiple sensors of the same type or of different types. In some examples, the analog sensor cell block 1010 includes a plurality of sensor cells. The logic circuit may be configured to consult a respective sensor cell of the analog sensor cell block 1010, in combination with the LUT(s)/list(s) 1006 and/or algorithm(s) 1008, based on a sensor ID and calibration parameters, to generate the digital output. The analog sensor cell block 1010 may include a sensor to detect an effect of a pneumatic actuation of the print apparatus upon the replaceable print component, and/or a sensor to detect an approximate temperature, and/or a print material level sensor, and/or other sensors. The logic circuitry package 1000 may include a plurality of sensors of different types, for example, at least two sensors of different types, wherein the logic circuit may be configured to select and consult one of the sensors based on the sensor ID, and output a digital value based on a signal of the selected sensor. In another example, the analog sensor cell block 1010 includes an array of sensor cells of the same type.

The output values may be generated using the LUT(s) and or list(s) 1006 and/or algorithm(s) 1008 whereby the parameters may be used as input. In addition, a signal of a sensor cell of the analog sensor cell block 1010 may be consulted as input for the LUT.

The example logic circuitry package 1000 may be used as an alternative to the complex thin film sensor arrays addressed elsewhere in this disclosure. The example logic circuitry package 1000 may be configured to generate outputs that are validated by the same print apparatus logic circuit designed to be compatible with the complex sensor array packages. The alternative package 1000 may be cheaper or simpler to manufacture, or simply be used as an alternative to the earlier mentioned packages, for example to facilitate printing and validation by the print apparatus.

Logic circuitry package 1000 may be configured to output digital values indicating sensor measurement data in response to a request. Logic Circuitry package 1000 may receive a first request to enter a power saving mode. The first request may set a bit in a dedicated bit field that indicates whether the package 1000 is in a power saving mode. Logic circuitry package 1000 may subsequently receive a second request to cause the at least one sensor 1010 to perform at least one sensor measurement. In response to the first and second requests, logic circuitry package 1000 may selectively enable and disable power to analog control circuitry and the analog sensor cell block 1010. In one example, the package 1000 may intelligently enable and disable power to the analog circuitry based on state machine control that manages sensor measurements. In one example, DC power to the analog circuitry is briefly enabled to allow the analog sensor cell block 1010 to provide sensor information for a sensor measurement, and then the DC power is disabled again automatically after the sensor measurement is performed by the analog control circuitry.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, which communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400a-400d, 1000 described herein may have any feature of any other logic circuitry packages 400a-400d, 1000 described herein or of the processing circuitry 424, 600, 640. Any logic circuitry packages 400a-400d, 1000 or the processing circuitry 424, 600, 640 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfil the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a replaceable print apparatus component comprising an analog sensor cell block with a plurality of sensor cells, analog control circuitry to bias and control the analog sensor cell block, an interface to communicate with a print apparatus logic circuit, a dedicated bit field that indicates whether the logic circuitry package is in a power saving mode, and at least one logic circuit configured to:
   receive, via the interface, a request to cause the analog sensor cell block to provide sensor information for at least one sensor measurement; and
   selectively enable and disable power to the analog control circuitry based on the request and a value of the dedicated bit field.

2. The logic circuitry package of claim 1, wherein the selectively enabling and disabling power to the analog control circuitry correspondingly selectively enables and disables power to the analog sensor cell block.

3. The logic circuitry package of claim 1, wherein the at least one logic circuit is further configured to:
   receive, via the interface, a command that sets the value of the dedicated bit field to indicate that the logic circuitry package is in the power saving mode.

4. The logic circuitry package of claim 1, wherein the at least one logic circuit is configured to:
   enable power to the analog control circuitry prior to the at least one sensor measurement when the value of the dedicated bit field indicates that the logic circuitry package is in the power saving mode.

5. The logic circuitry package of claim 1, wherein the at least one logic circuit is configured to:
   disable power to the analog control circuitry in response to completion of the at least one sensor measurement when the value of the dedicated bit field indicates that the logic circuitry package is in the power saving mode.

6. The logic circuitry package of claim 1, wherein the at least one logic circuit includes a state machine to generate a control signal to selectively enable and disable power to the analog control circuitry.

7. The logic circuitry package of claim 6, wherein the state machine generates the control signal based on occurrences of sensor measurements.

8. The logic circuitry package of claim 1, wherein the interface comprises an I2C interface.

9. A logic circuitry package, comprising:
   an I2C interface to receive a sensor measurement request;
   an analog sensor cell block with a plurality of sensor cells;
   analog control circuitry to bias and control the analog sensor cell block;
   a dedicated bit field that indicates whether the logic circuitry package is in a power saving mode; and
   a controller to selectively enable and disable power to the analog control circuitry based on the received sensor measurement request and a value of the dedicated bit field.

10. The logic circuitry package of claim 9, and further comprising:
    a first register; and
    wherein the sensor measurement request includes a command to write a value to the first register that indicates a type of sensor measurement to be performed.

11. The logic circuitry package of claim 9, and further comprising:
    a second register to store the dedicated bit field; and
    wherein the I2C interface is configured to receive a command to set the value of the dedicated bit field in the second register to indicate that the logic circuitry package is in the power saving mode.

12. The logic circuitry package of claim 9, wherein the controller enables power to the analog control circuitry to perform at least one sensor measurement when the value of the dedicated bit field indicates that the logic circuitry package is in the power saving mode.

13. The logic circuitry package of claim 9, wherein the controller disables power to the analog control circuitry in response to completion of at least one sensor measurement when the value of the dedicated bit field indicates that the logic circuitry package is in the power saving mode.

14. The logic circuitry package of claim 9, wherein the controller comprises a state machine to control sensor measurements and to generate a control signal to selectively enable and disable power to the analog control circuitry based on when the sensor measurements occur.

15. A method, comprising:
    transmitting, via a print apparatus logic circuit to a logic circuitry package, a command to set a value of a dedicated bit field in the logic circuitry package to indicate that the logic circuitry package is in a power saving mode; and
    transmitting, via the print apparatus logic circuit to the logic circuitry package, a request to cause an analog sensor cell block in the logic circuitry package to provide sensor information for at least one sensor measurement, wherein the logic circuitry package causes power to analog control circuitry controlling the analog sensor cell block to be selectively enabled and disabled based on the request and the value of the dedicated bit field.

16. The method of claim 15, and further comprising:
    receiving, via the print apparatus logic circuit from the logic circuitry package, sensor measurement information based on the at least one sensor measurement.

* * * * *